(12) United States Patent
Eliasson

(10) Patent No.: US 7,614,282 B2
(45) Date of Patent: Nov. 10, 2009

(54) APPARATUS AND METHOD FOR TESTING FLEXIBLE PACKAGES FOR DEFECTS

(75) Inventor: Matts Eliasson, Westlake (AU)

(73) Assignee: Inspection Machinery (No 2) Pty Ltd., Sumner Park, Queensland (AU)

( * ) Notice: Subject to any disclaimer, the term of this patent is extended or adjusted under 35 U.S.C. 154(b) by 0 days.

(21) Appl. No.: 11/628,926

(22) PCT Filed: Jun. 7, 2005

(86) PCT No.: PCT/AU2005/000815

§ 371 (c)(1),
(2), (4) Date: Aug. 13, 2007

(87) PCT Pub. No.: WO2005/121738

PCT Pub. Date: Dec. 22, 2005

(65) Prior Publication Data

US 2008/0127716 A1    Jun. 5, 2008

(30) Foreign Application Priority Data

Jun. 7, 2004  (AU) ............................. 2004903050

(51) Int. Cl.
G01M 3/34 (2006.01)
(52) U.S. Cl. .................................................. 73/49.3
(58) Field of Classification Search ............... 73/49.3, 73/45.4, 52
See application file for complete search history.

(56) References Cited

U.S. PATENT DOCUMENTS

| | | | | |
|---|---|---|---|---|
| 3,650,145 A | * | 3/1972 | Nelson | 73/49.3 |
| 3,667,281 A | * | 6/1972 | Pfeifer | 73/49.3 |
| 3,751,972 A | * | 8/1973 | Hass | 73/45.4 |
| 4,663,964 A | | 5/1987 | Croce | |
| 4,697,452 A | * | 10/1987 | Prakken | 73/49.3 |
| 4,887,457 A | | 12/1989 | Humbarger | |
| 5,513,516 A | * | 5/1996 | Stauffer | 73/49.3 |
| 5,618,990 A | * | 4/1997 | Iwao et al. | 73/40 |
| 2003/0033857 A1 | | 2/2003 | Franks | |

FOREIGN PATENT DOCUMENTS

| | | |
|---|---|---|
| EP | 0181722 | 1/1990 |
| EP | 0355699 | 2/1990 |
| EP | 0702223 | 4/2000 |
| SU | 89/1411595 | 7/1988 |
| SU | 91/1603203 | 10/1990 |
| WO | WO 93/15385 | 8/1993 |

* cited by examiner

*Primary Examiner*—Hezron Williams
*Assistant Examiner*—Alex Devito
(74) *Attorney, Agent, or Firm*—James Creighton Wray; Meera P. Narasimhan

(57) ABSTRACT

A method and apparatus for leak detection in flexible packages involves the location of a flexible fluid containing package (2) in a sealed chamber (1) and evacuating air from the chamber to a predetermined pressure value. An initial measurement of a reference dimension (h1) of the package is made by a sensor (8) and after a predetermined period of time a second measurement of the reference dimension (h1) is made by the sensor (8) to detect any change in that reference dimension as indicative of a leakage of fluid from the package (2).

21 Claims, 9 Drawing Sheets

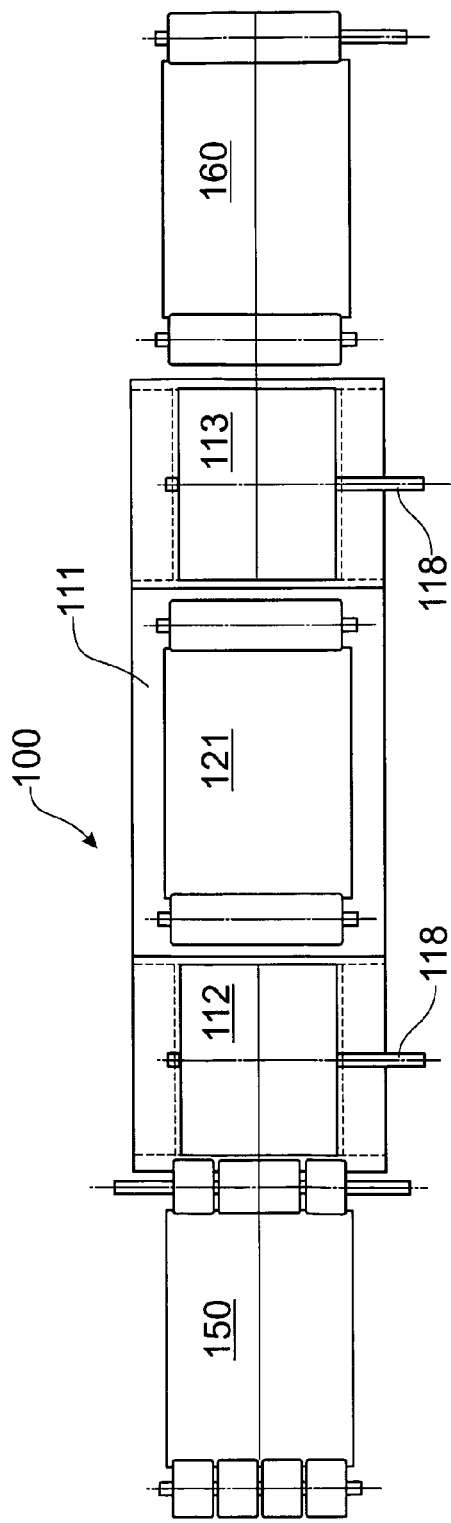
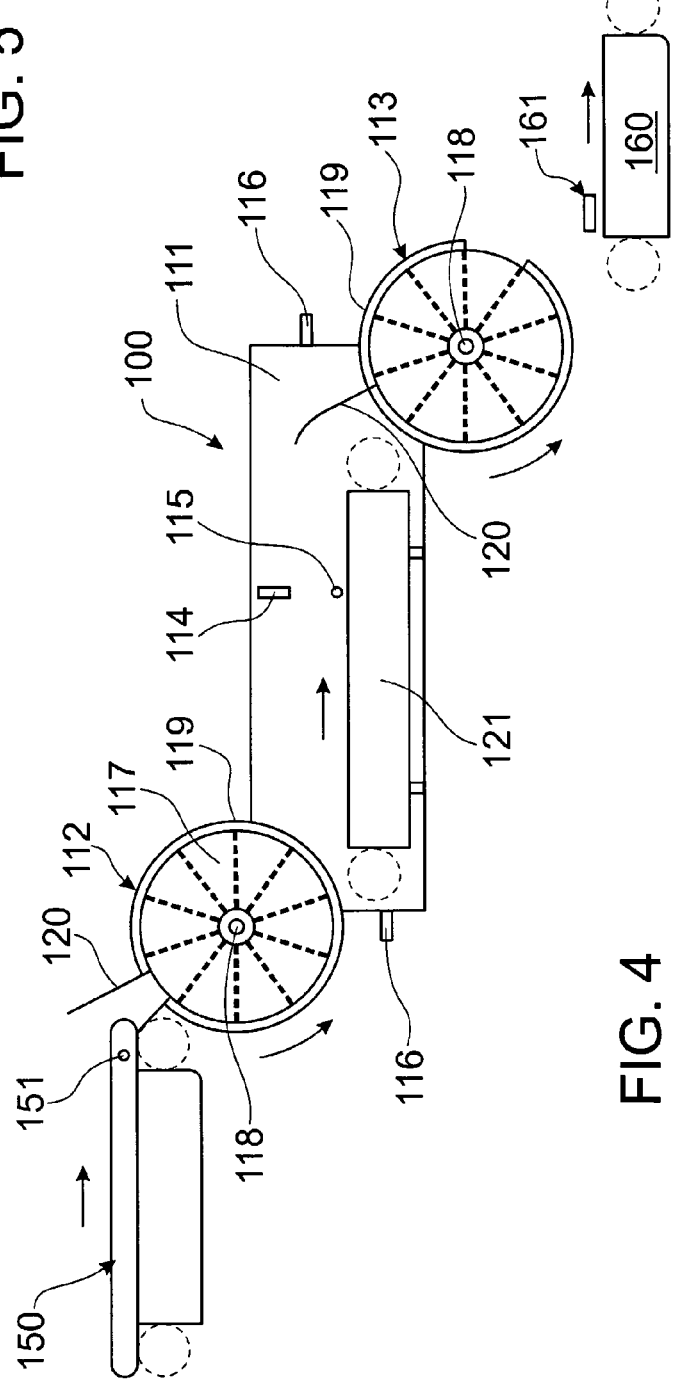
FIG. 5
FIG. 4

APPARATUS AND METHOD FOR TESTING FLEXIBLE PACKAGES FOR DEFECTS

This application claims the benefit of Australian Application No. 2004903050 filed Jun. 7, 2004 and PCT/AU2005/000815 filed Jun. 7, 2005, which are hereby incorporated by reference in their entirety.

FIELD OF THE INVENTION

This invention relates to an apparatus and method for testing flexible packages for defects.

In particular, the invention relates to the testing of flexible packages for leakage defects and therefore will be described in this context.

BACKGROUND OF THE INVENTION

Flexible pouches and pillow packages are used to wrap a multitude of different items, especially in the food industry. It is important that these packages are gastight so that food items located within the packages are protected. For certain foodstuffs, particularly fresh packaged foodstuffs, various mixtures of gases such as nitrogen, carbon dioxide and carbon monoxide are employed to maintain freshness. Some of these packaging films allow selective ingress or egress of gases to prolong the relatively short shelf life of the packaged product. Other food items such as snack foods can have lengthy shelf life periods and employ packaging films such as aluminized Mylar (Trade Mark) which are substantially impervious to gas. In other fields such as sterile medical consumables including syringes, catheters and the like, these items are usually packaged in an atmosphere of ethylene oxide, a sterilizing agent. However, current packaging techniques produce a small number of packages that have defects and therefore are not gastight. Such defects may arise from perforations in a packaging film or otherwise from the package sealing process. Food manufacturers need to identify packages with defects before they are distributed to retailers and ultimately to consumers in order that only quality produce is provided and thereby maintain customer loyalty based on product integrity.

Food packaging usually occurs at high speed with the packages passing along a production line. Often up to 800 packages per minutes pass through the production line with each package having an amount of gas located within the package.

Currently, inspectors are employed on the production line to visually identify packages that have deflated indicating that the packages have defects. These inspectors eliminate a proportion of packages with defects. However, due to the operating speed of the production line and nature of some of the defects, a substantial number of packages with defects are not identified.

In an attempt to minimise the number of defect packages not so identified, an apparatus has been developed that employs a mechanical sensor to determine if the correct pressure is located within each package. The mechanical sensor comprises two vertically spaced rollers through which packages pass. Packages that do not have defects exert a load on the rollers which is compared to a predetermined value to indicate that the package is sound. Packages with defects exert a load on the rollers that is less than the predetermined value thereby indicating an insufficiently inflated package or a leaking package.

A problem with this apparatus is that fragile or brittle foods such as potato chips located within the package can be damaged when passed through the rollers even when the package is correctly sealed. Further, food items can become positioned within the package to give a false load reading to indicate the packages are sound when they should be rejected.

An apparatus known as the WILCOMAT (Trade Mark) DL/V tests air or gas containing packages for leaks by placing a package in a sealed chamber and evacuating air from within. If the vacuum level in the test chamber fails to reach a defined minimum or if during a predetermined test period a vacuum difference is detected, the package is rejected.

Another apparatus known as the WILCOMAT (Trade Mark) MC/LFC comprises a conveyor system comprising transport pucks into which a liquid filled container is placed. The pucks are conveyed to test chambers in which a vacuum is created to a predetermined value and then after a predetermined period of time the chamber pressure is measured whereby a pressure change is indicative of the amount of liquid which leaks from a pack and is vaporized.

U.S. Pat. No. 5,513,516 describes another pressure differential measurement system for detecting leaks in packages. In this system, a package having a gas headspace is located in a sealed chamber which is evacuated to create a pressure differential between the interior of the chamber and the interior of a package. After a predetermined period of time any decay in the value of the chamber pressure is indicative of a gas leak from the package. Typically, a change in pressure of 10 millibar or greater is deemed to constitute a leak. Similar leak detection systems are disclosed in U.S. Pat. Nos. 5,042,291 and 5,029,464.

Japanese Patent Application Numbers 63078071 and 05100608 also describe leak detection systems wherein a package is subjected to a predetermined vacuum value in a sealed chamber and any decay in that value over a predetermined value of time is indicative of a gas leak from the package.

While generally satisfactory for their respective intended purposes, these differential vacuum processes are relatively slow, highly capital and space intensive and have high maintenance overheads in retaining the integrity of the vacuum chamber seals.

It is an object of this invention to overcome or ameliorate at least some of the disadvantages associated with prior art leak detection systems or to provide the consumer with a useful or commercial choice.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

SUMMARY OF THE INVENTION

According to one aspect of the invention there is provided a method for detection of fluid leaks in a flexible package, said method comprising the steps of:

locating a flexible fluid containing package in a sealable chamber;

reducing the gas pressure within said chamber to a predetermined value;

measuring a reference dimension associated with said package; and, after a predetermined period of time, measuring said reference dimension to detect any change in said dimension as indicative of a leakage of fluid for said package.

Suitably, said reference dimension may comprise a length measurement measured along a longitudinal axis of said package.

Alternatively, said reference dimension may comprise a width measurement across a transverse axis.

Preferably, said reference dimension comprises a depth measurement between a lower surface and an upper surface of said package.

If required, said reference dimension may be measured from a position within said chamber remote from said package.

Suitably, said reference dimension may be measured relative to a predetermined datum.

The predetermined datum may comprise an inner surface of said chamber.

The reference dimension may be measured by any suitable device including optical, mechanical, electrical, electro-mechanical, sonic, particle emission or particle absorption dimension measuring systems or a combination thereof.

If required, a load of predetermined value may be applied to said package to accelerate fluid leakage from any leakage aperture therein.

Suitably, said load is mechanically applied.

According to another aspect of the invention there is provided an apparatus for detection of fluid leaks in a flexible package, said apparatus comprising:

a sealable chamber;

a gas evacuation system to reduce gas pressure within said chamber to a predetermined value; and, a detection device to measure any change in a reference dimension associated with said package over a predetermined period of time.

Suitably, said apparatus includes a conveyor mechanism to convey said packages into said chamber for leak detection.

If required, said apparatus may include a conveyor mechanism to convey said packages from said chamber after leak detection.

The apparatus may include a reject mechanism to reject packages identified as having failed at least one predetermined leak test criterion.

The apparatus may be adapted to detect leakages in single packages.

If required, the apparatus may be adapted for leak detection in any one of a plurality of packages in a batch process.

Preferably, said apparatus is adapted for leak detection in anyone of a plurality of packages in a continuous system.

The detection device may be selected from any suitable position detecting system including optical, mechanical, electrical, electro-mechanical, sonic, particle emission or particle absorption position detectors or any combination thereof.

If required, the detection device may be located internally of said chamber.

Alternatively, the detection device may be located externally of said chamber.

Suitably, said apparatus includes a load applicator to apply a load of predetermined value to said packages to accelerate fluid leakage from any leakage aperture therein.

BRIEF DESCRIPTION OF THE DRAWINGS

In order that the invention may be readily understood and put into practical effect, exemplary embodiments are illustrated in the accompanying drawings in which:—

FIG. 4 shows schematically a side elevational view of a further embodiment of the invention;

FIG. 5 shows schematically a top plan view of the embodiment of FIG. 4;

DETAILED DESCRIPTION OF THE DRAWINGS

Figure 1:
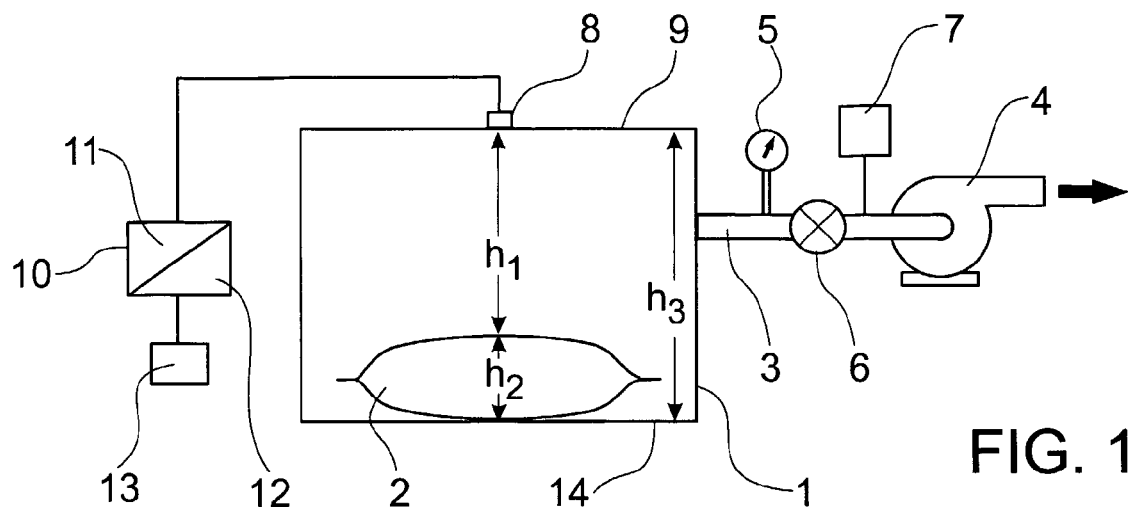
FIG. 1 shows schematically a first embodiment of the invention.

In the accompanying drawings, where appropriate, like reference numerals are employed for like features for the sake of clarity and ease of understanding.

FIG. 1 shows schematically a first embodiment of the invention.

A vacuum chamber 1 has located therein a pillow pack 2 containing a fragile comestible such as potato crisps or the like. Coupled to chamber 1 via conduit 3 is a vacuum pump 4 or the like to evacuate air from the chamber or at least to reduce air pressure therein to a predetermined value indicated by pressure gauge 5. A valve 6 in conduit 3 may be utilized to isolate the interior of chamber 1 for a predetermined period of time while package 1 is being tested for leaks. If required, a vacuum accumulator vessel 7 may be coupled between chamber 1 and vacuum pump 4 to enable rapid evacuation of chamber 1 for greater throughput.

An optical detection device such as a laser transmitter/receiver 8 is located in an upper wall 9 of container 1 and is coupled to an electronic device 10 including a timer 11, a comparator 12 and a signal output device 13.

In use, a pillow pack 2 is placed inside chamber 1 which is then sealed against ingress of gas. The gaseous pressure within chamber 1 is then reduced to a suitable pressure of from 0.05 to 0.5 bar to cause pillow pack 2 to inflate as a result of air or gas therein previously at atmospheric pressure (about 1 bar).

While the internal pressure within chamber 1 is retained at a substantially constant value, an initial reading of the distance $h_1$ is taken.

This can represent the height $h_2$ of pillow pack 2 when the height $h_3$ between detector 8 and the base 14 of chamber 1 is known.

After a predetermined period of time controlled by timer 11, a further measurement of the distance $h_1$ (or effectively $h_2$) is made and the initial and final distance values are compared by comparator 12. Where the values being compared are substantially identical, it can be taken to indicate that the package has no defects which could cause air or gas leakage. Where the comparison of distances shows effectively that the height $h_2$ of pillow pack 2 has reduced, this is indicative of an air or gas leakage from the package 2. The distance differential value signal is then output to signal output device 13 which may display a fail/pass sign or it may direct a signal to a reject mechanism (not shown) associated with chamber 1.

Figure 2:
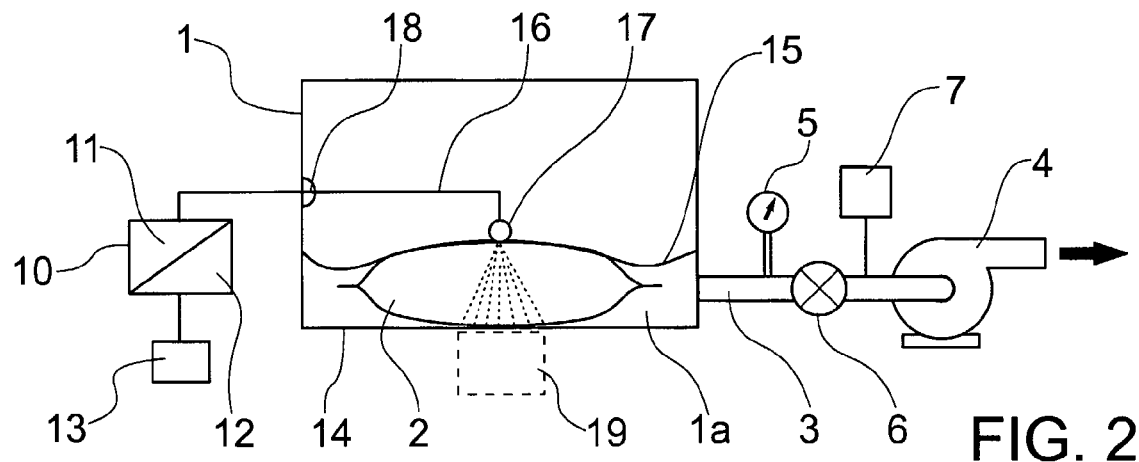
FIG. 2 shows schematically a second embodiment of the invention.

FIG. 2 shows schematically an alternative embodiment to that of FIG. 1.

In FIG. 2, the chamber 1 is fitted with a sealed flexible diaphragm 15 which stretches down over inflated pillow pack 2 when the internal pressure in the lower region 1a of chamber 1 is reduced. Located above and in contact with diaphragm 15 is an arm 16 having a contactor 17 at its free end. Arm 16 is pivotally mounted to a potentiometer or the like 18 which sends calibrated signals at the beginning and end of the test time period established by timer 11. Similarly, the initial and final signal values from potentiometer 18 are compared by comparator 12 to establish whether a leak is indicated by a change from the initial signal value.

Contactor 17 may comprise a mass of predetermined value to accelerate a fine leak from pillow pack 2. To avoid obstruction of a fine perforation in the package film where the package contacts diaphragm 15 on base 14, a gas pervious fabric or paper mat (not shown) may be located on each contact face of the pillow pack 2. In an alternative embodiment, contactor 17 may include a source of electromagnetic radiation such as gamma rays. A gamma ray detector 19 may be located beneath base 14 of chamber 1 to detect changes in the height of package 2 as a function of changes in radiation density is detected.

Figure 3:
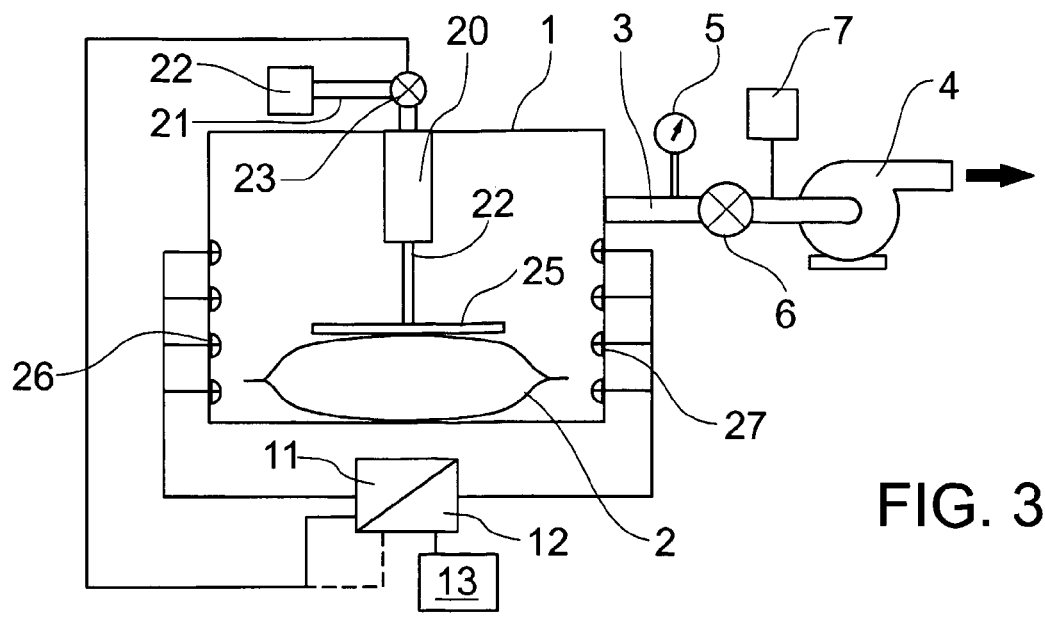
FIG. 3 shows schematically another embodiment of the invention.

FIG. 3 shows yet another embodiment of the invention.

In FIG. 3, a fluid powered ram 20 is coupled via conduit 21 to a source 22 of pressurized fluid. A solenoid valve 23 or the like is provided in conduit 21 between fluid source 22 and ram 20 with solenoid valve 23 being in electrical communication with timer 11 and optionally as shown in phantom with comparator 12. Attached to the piston shaft 24 of ram 20 is a plate member 25. Mounted on opposite sides of chamber 1 are enlarged arrays of optical transmitters 26 and optical receivers 27.

In this embodiment, ram 20 may be actuated to allow plate 25 to contact inflated pillow pack 2 under a simple gravitational force or ram 20 may apply a predetermined pressure to accelerate any fine leakages.

A leakage in inflated pillow pack 2 may be detected either by a movement in plate 25 by measuring differences in fluid volume within ram 20 or alternatively, by utilizing optical transmitters 26 and receivers 27 to detect an empirical value of the plate movement or simply that the plate has moved downwardly to expose previously obscured optical receivers 27.

FIGS. 4 and 5 show an apparatus 100 for continuously testing pillow packages for defects. The apparatus forms part of a production line within an input conveyor 150 located adjacent to and slightly above one end of the apparatus 100 and an output conveyor 160 located adjacent to and slightly below an opposite end of the apparatus 100. The input conveyor 120, output conveyor 130 and apparatus 100 allow two side-by-side packages to pass through the production line.

The apparatus includes a pressure chamber 111, an inlet valve 112, an outlet valve 113, a measuring sensor 114 and a proximity sensor 115.

The pressure chamber 111 is a rectangular box-like structure that is substantially sealed to the atmosphere. A vacuum pump (not shown) is connected to each end of the pressure chamber via ports 116 to establish and maintain an internal pressure of between 0.05 to 0.4 atmospheres.

The inlet valve 112 is located adjacent one end of the pressure chamber. The inlet valve 112 has receptacles 117 that rotate about a shaft 118. The receptacles 117 are used to transfer packages from the input conveyor 150 into the pressure chamber 111. An outer casing 119 is located around the inlet valve 112 to prevent the packages from falling out of their respective receptacles 117 when moving packages from the input conveyor 150 into the chamber 111. The outer casing 119 also assists in minimising the loss of pressure within the pressure chamber 111.

An indexing sensor 151 drives the input conveyor 150 forward at the correct point in time so that packages are delivered into the receptacles 117. A feeding throat 120 assists in loading of the packages into the receptacles.

The outlet valve 113 is located adjacent to the opposite end of the chamber to the inlet valve 112. The outlet valve 113 is of the same configuration as the input valve 112 and operates in the same manner except that packages are loaded from the pressure chamber 111 and delivered on to the output conveyor 160.

A chamber conveyor 121 is located within the pressure chamber 111 to transfer packages from the inlet valve 112 to the outlet valve 113. The chamber conveyor 121 is of a length and run at a speed that allows each package time to substantially inflate when passing through the pressure chamber 111. The chamber conveyor 121, inlet valve 112 and outlet valve 113 are all operated at the same line speed so that packages travel smoothly through the apparatus 100.

The measuring sensor 114 and proximity sensor 115 are located adjacent the end of the chamber conveyor 121 adjacent to the outlet valve 113. The proximity sensor 115 establishes when a package is in alignment with the measuring sensor 114.

The measuring sensor 114 is located above the chamber conveyor 121 and lies in the same plane as the proximity sensor 115. The measuring sensor 114 comprises a transmitter and a receiver located adjacent each other. The transmitter sends a modulated pulse when the proximity sensor 115 indicates that a package is aligned with the transmitter. The time is measured for the pulse to travel from the transmitter, reflect off the package and enter the receiver.

A reject mechanism 161 is located on the output conveyor to remove packages with defects. The reject mechanism 161 is an air blower that fires a blast of air to remove the defective packages.

The production line operates by delivering sealed packages along the input conveyor 150. An indexing sensor 151 indicates when packages are adjacent the end of the input conveyor 150. The packages are held at this position until each receptacle 117 of the inlet valve 112 is ready to receive a pillow package. The packages are then loaded into the receptacle. The inlet valve 112 is rotated and packages are passed onto the chamber conveyor 121.

The packages inflate upon arrival within the pressure chamber 111 due the lower pressure within the chamber 111. The packages continue to inflate as they move along the chamber conveyor 121 and receive maximum inflation before the packages come in to alignment with the proximity sensor 115.

The proximity sensor 115 indicates when packages are in alignment with the measuring sensor 114. The measuring sensor 114 then measures the time taken for a pulse to travel from the transmitter, reflect off the package and enter the receiver. This time is compared with a predetermined value to determine whether the package is sound. If the package is deflated then the time the pulse takes to travel from the transmitter to the receiver will be longer than the predetermined time interval indicating that the package is defective.

The packages are then loaded into the receptacles 117 of the outlet valve 113 and delivered to the output conveyor 160. If any packages are found to have defects, an indexed signal is sent to the reject mechanism 161 which removes the appropriate packages.

Figure 6:
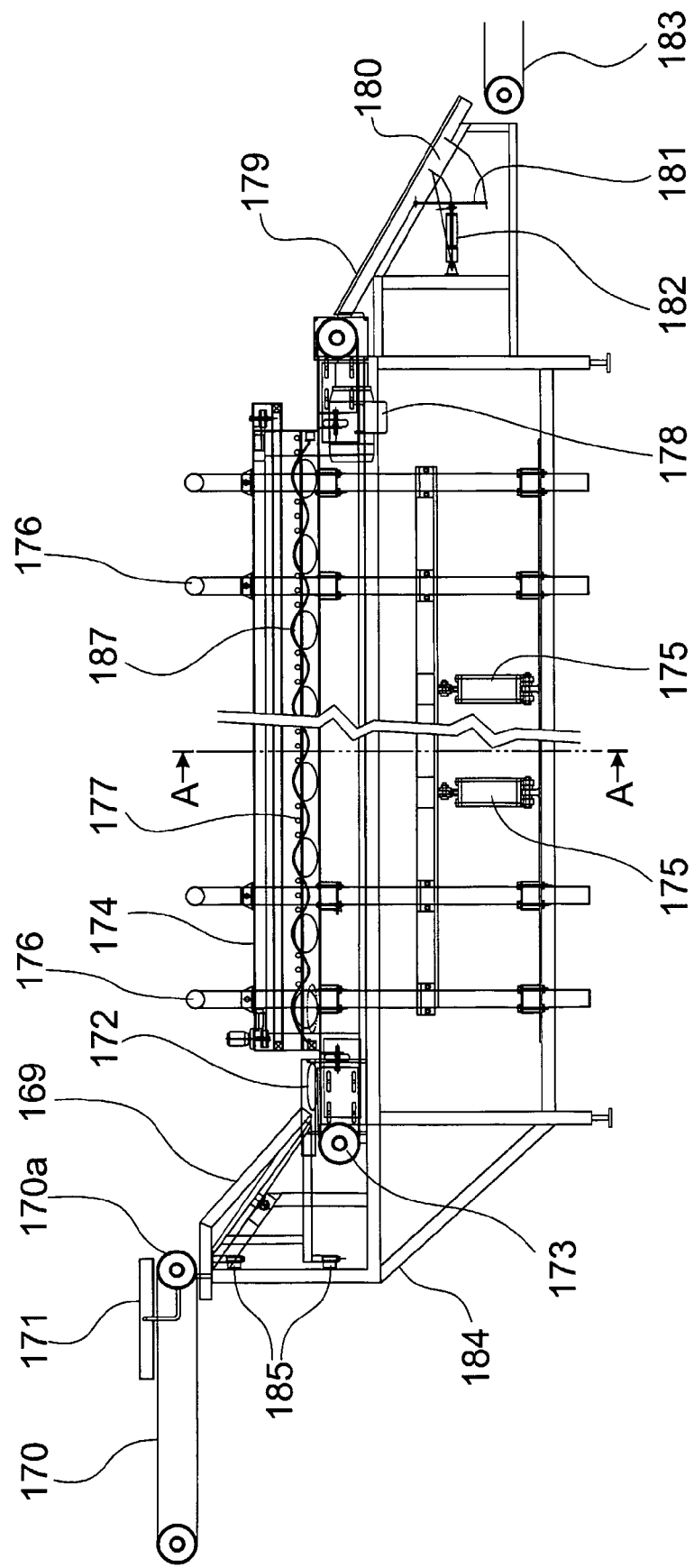
FIG. 6 shows schematically a side elevational view of yet another embodiment of the invention.
Figure 7:
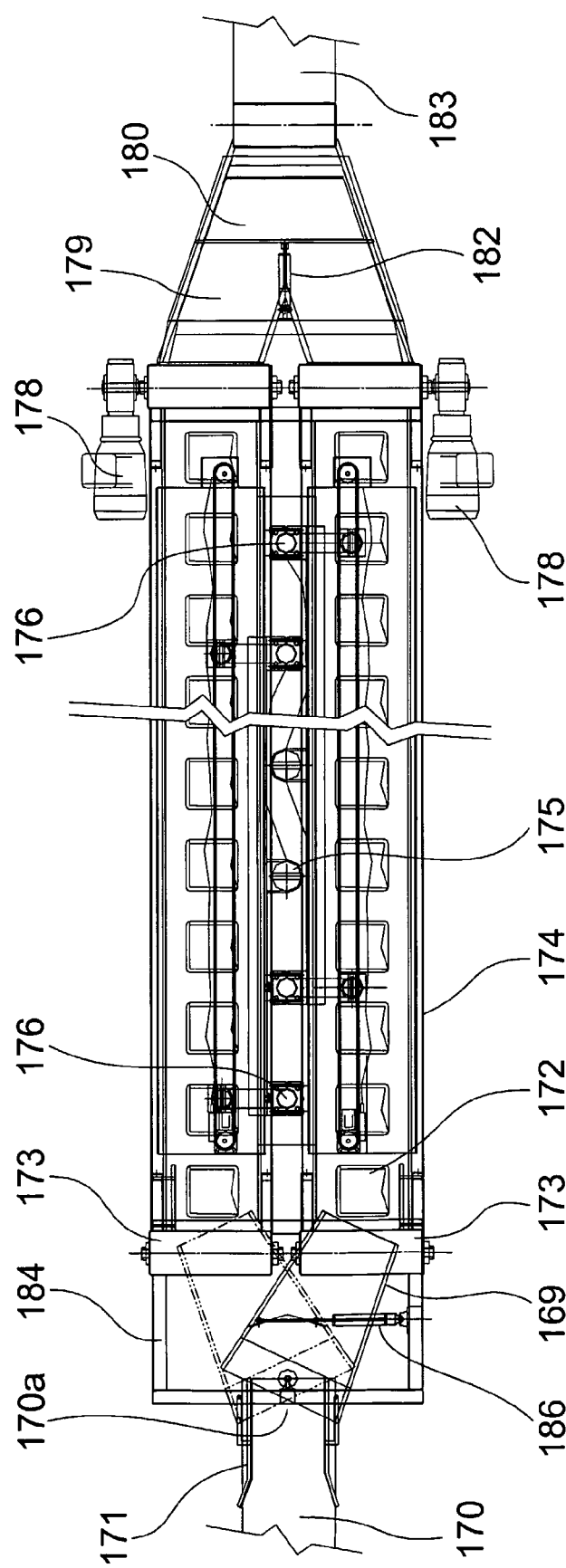
FIG. 7 shows schematically a top plan view of the embodiment of FIG. 6.
Figure 8:
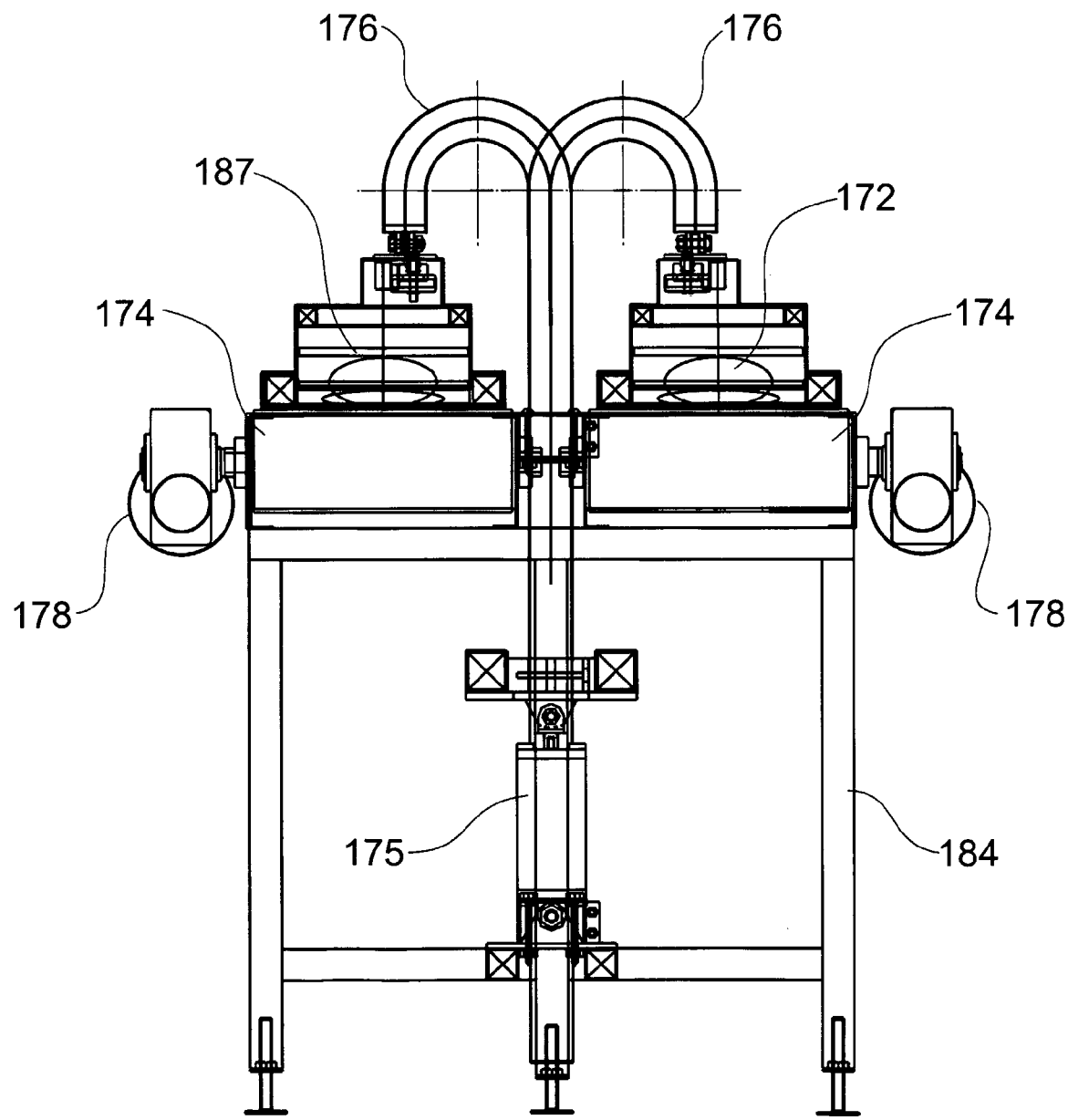
FIG. 8 shows schematically a cross-sectional view through A-A in FIG. 6.

FIGS. 6 to 8 show an alternative embodiment of the invention for batch processing of packages.

Referring first to FIGS. 6 and 8, the apparatus comprises a feed conveyor 170 to feed packages issuing from a packaging machine (not shown). Towards the distal end 170a of a conveyor 170 are a pair of spaced guides 171 to assist in aligning packages generally centrally of conveyor 170 as they leave the conveyor.

Positioned at the distal end of conveyor 170 is a pivotally mounted guide chute 169 which directs packages 172 onto one of a pair of conveyors 173 positioned in side by side relationship.

Mounted over each conveyor 173 is a vacuum chamber 174 movable between a closed position as shown and an elevated position above a respective conveyor 173 by pneumatic cylinders 175 coupled to support brackets 176. On the opposed inner walls of each chamber 174 there are mounted a row 177 of infrared transmitter/receiver devices and respective aligned reflectors adapted to detect the presence or absence of an object therebetween.

A conveyor drive motor 178 is coupled to a pulse encoder (not shown) to selectively advance the conveyor as required. The purpose of the pulse encoder will be described later.

At the distal end of conveyor 173 is an inclined outlet chute 179 with a reject aperture 180 towards a lower end thereof. Reject aperture 180 is selectively opened or closed by a pivotal gate 181 actuated by a pneumatic cylinder 182. A take-off conveyor 183 is positioned at the end of chute 179 to receive packs issuing therefrom.

The operation of the apparatus will be described with reference to FIGS. 6 and 7.

As filled packages 172 pass through guides 171, they fall onto guide chute 169 which is pivotally mounted to frame 184 by pivotal brackets 185 (shown in FIG. 6) for pivotal movement between the two conveyors 173 by a pneumatic cylinder 186 (shown in FIG. 7).

With chamber 174 in an elevated state, an optical sensor (not shown) detects the arrival of a first package on one conveyor 173 in front of chamber 174 which resets an indexing controller (not shown) coupled to the pulse generator (also not shown) coupled to the conveyor drive. With the package position indexed, conveyor 173 is advanced by a predetermined distance established by a finite number of pulses generated by the pulse generator as packages are fed onto the conveyor.

As the first package approaches a stop position adjacent the end of chamber 174, guide chute 169 is pivoted over to the other conveyor 173 and the same process is repeated thereon.

At the same time that guide chute 169 is pivoted over to feed the other conveyor 173, pneumatic cylinders 175 are actuated to close chamber 174 against the surface of conveyor 173 to form an air tight seal. Chamber 174 is then evacuated by an air pump (not shown) until a predetermined pressure is reached within the chamber. As shown in FIG. 6 a flexible mat 187 suspended within chamber 174 drapes over packages 172 with sufficient mass as to smooth out any wrinkles therein.

When the chamber has been evacuated to the desired degree, sensors 177 determine the presence and the relative locations of packages on the conveyor by interruptions to the infrared light beams traversing the chamber at a predetermined distance above the surface of conveyor 173. In the event that a package is inadequately sealed, it will not expand sufficiently to interrupt the light beam and a signal representing the position of the failed package is transmitted to the conveyor drive controller system.

At the same time, pneumatic cylinders 175 are actuated to elevate the chamber 174 and guide chute 169 is swung back to align with the first conveyor 173. Conveyor 173 is then actuated and simultaneously receives a feed of new packages whilst delivering tested packages to the take-off conveyor 183. As the drive controller is able to identify the position of any failed package as a number of pulses distant from a reference point, the controller can actuate reject gate 181 at an appropriate time to reject a failed package.

As shown in FIGS. 6 and 7, the apparatus may be constructed with a telescopic conveyor bed 170 and/or telescopic vacuum chamber 174.

Figure 10:
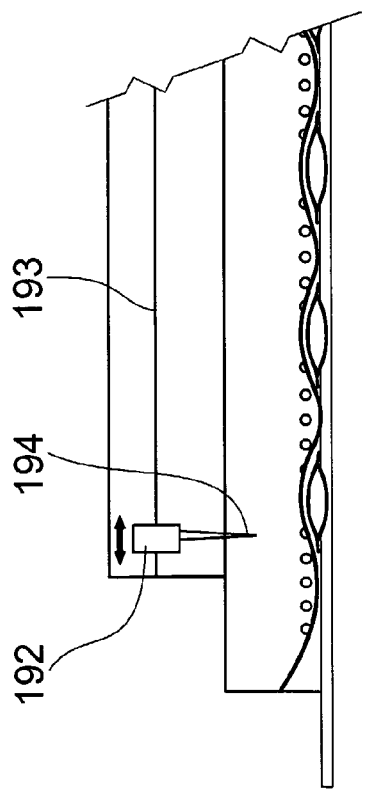
FIG. 10 shows an enlarged part-sectional view of the embodiment of FIG. 9.

FIGS. 7 and 10 are enlarged schematic illustrations of the vacuum chamber 174 and conveyor system 173 to more clearly illustrate the method of determining whether a package should be rejected as a consequence of leak measurement.

Figure 9:
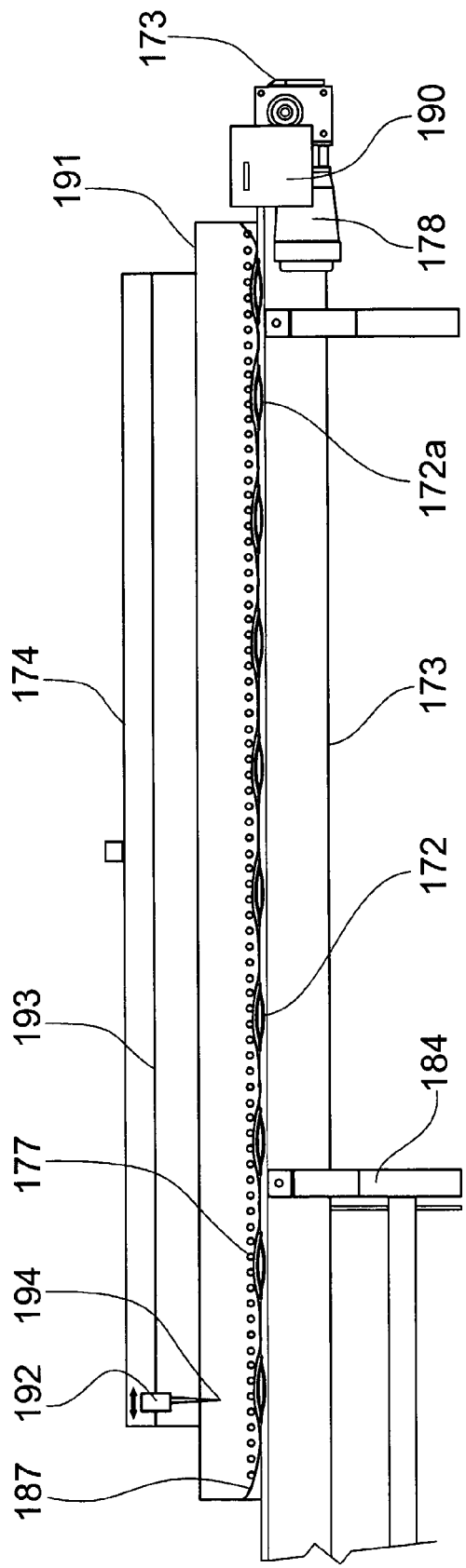
FIG. 9 shows schematically a side elevational sectional view of a still further embodiment of the invention.

Initially, with chamber 174 in an elevated state, flexible rubber mat 187 hangs downwardly but as chamber 174 moves into the closed position as shown in FIG. 9, mat 187 drapes over the spaced packages 172 to apply a static light preload to each package. Infra-red sensors 177 spaced at about 25 mm intervals along one side of the path of conveyor 173 emit a beam of radiation which is reflected back to the sensor by reflectors along the opposite side of the conveyor path and are spaced at a height which enables the presence of each package to be sensed by blocking the path of at least one infra-red beam near the longitudinal centre of each package. In this initial state, the sensors 177 each direct a signal to processor 190 which incorporates an indexing controller to locate the first package 172a at a desired location towards the distal end 191 of chamber 174 by means of a pulse generator also associated with processor 190. Once the initial position of package 172a is indexed via a sensor 177 at the proximal end of conveyor 173, conveyor 173 is advanced by a predetermined distance established by a finite number of pulses generated by the pulse generator as packages are fed onto conveyor 173.

When chamber 174 is evacuated the packages 172 expand as shown in FIG. 10 against the preload of mat 187 thereby interrupting certain of the reflected infra-red beams traversing the chamber 174. Such interruption is detected by processor 190 but should a particular package fail to interrupt one or more of the infra-red beams at an indexed package position due to inadequate sealing, this is detected by the processor 190 to enable actuation of the reject gate 181 to reject that package as it leaves the conveyor 173.

While a two step measurement process is suitable for detection of unsealed or badly sealed packages, it is not satisfactory for packages having a very small leakage path. This may be determined by maintaining the packages in the evacuated chamber 174 for a predetermined time period to ascertain whether, under the preload applied by mat 187, a slow gas leakage will allow a package to deflate sufficiently to permit a previously blocked infra-red beam path to be re-established. Again, should a particular sensor detect re-establishment of an infra-red beam, processor 190 detects the position of the package whereby the reject mechanism 181 can be actuated at an appropriate time to direct the reject package away from the handling path of other packages.

FIGS. 9 and 10 show yet another embodiment of a sensor capable of measuring actual or relative package surface heights as a function of inflation at an initial position at atmospheric pressure, an inflated position when the chamber is evacuated and/or at a time extended inflated position.

Located within chamber 174 is a laser emitter/detector device 192 which is mounted on a track 193 to enable it to move from one end of chamber 174 to the other. Laser sensor 192 can measure empirically the distance between the tip 194 and the upper surface of mat 187 and thereby be calibrated to measure package height. Alternatively, it may be adapted to measure departures from a predetermined range of distances which are indicative of desired package sealing parameters. Laser sensor 192 is coupled to processor 190 and may be driven along track 193 by a stepping motor or the like to identify individual packages which fail to meet predetermined sealing parameters.

If required, laser sensors could travel a first path to measure the height of the packages at atmospheric pressure and then on a return path measure the inflated package heights when the chamber 174 is evacuated. A third traverse may be employed over the inflated packages after a predetermined time period to locate slow leaking packages.

The laser sensor may be employed on its own or in conjunction with infra-red transmitter/receiver devices 177.

By utilising conveyors and testing chambers in tandem as shown, one conveyor can be static for a time sufficient to evacuate the chamber whilst the other conveyor is delivering tested packages and reloading with a fresh batch of packages for testing.

It has been found that an apparatus with evacuation chambers about 1.8 m-2 m in length can accommodate the feed rate of a typical packaging machine at about 100 packages per minute.

Figure 11:
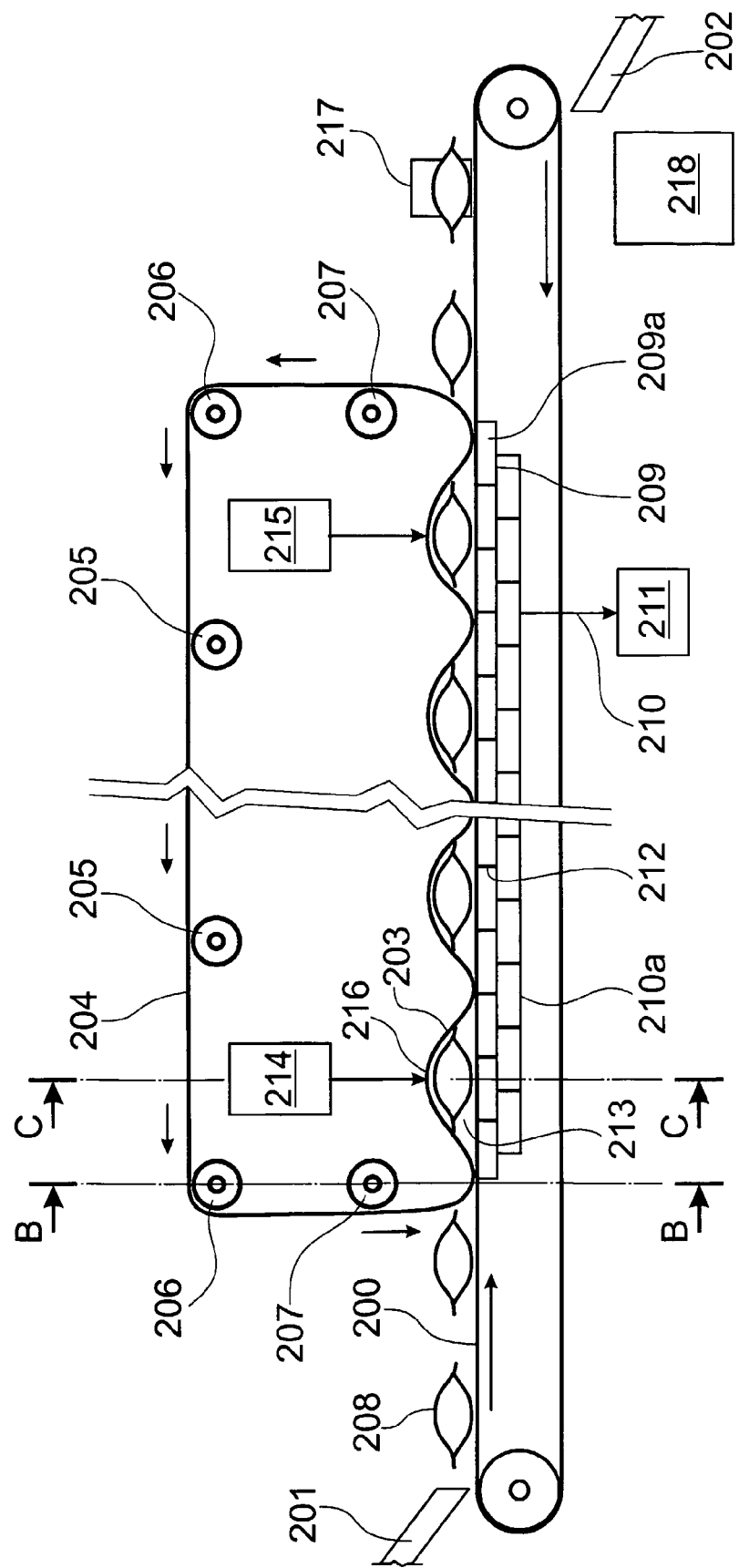
FIG. 11 shows schematically a side elevational view of a further embodiment of the invention.

FIG. 11 shows schematically a still further embodiment of the invention in the form of a continuous package integrity tester for high volume throughputs.

In FIG. 11, there is shown a belt conveyor 200 with package feed mechanism 201 at one end and a package removal mechanism 202 at the opposite end of belt conveyor 200. Located above conveyor 200 is a flexible shroud belt 203 with an upper portion 204 supported above conveyor 200 by idler rolls 205 and drive rolls 206 coupled to drive motors (not shown) to drive shroud belt 203 at the same lineal velocity as the conveyor 200. Further, idler rolls 207 located adjacent each end of shroud belt 203 at a height above conveyor 200 are sufficient to allow pillow packs 208 to pass thereunder without contact.

Positioned below conveyor 200 and in contact with a lower surface thereof is a vacuum plenum 209 coupled via conduit 210 to a vacuum pump, vacuum accumulator or the like 211. Plenum 209 is transversely divided by separator walls 212 to form, in effect a plurality of separate sub-plenums 209a below conveyor 200 with each plenum being fluidically coupled to a manifold 210a coupled to conduit 210.

Conveyor 200 has an air pervious region (not shown) extending longitudinally of the conveyor belt to permit fluid communication with adjacent plenums 209a whereby, in use, flexible shroud belt is drawn into sealing engagement with the upper surface of conveyor 200. As packages 208 are fed onto conveyor 200 they pass between shroud belt 203 and conveyor 200 and shroud belt 203 and conveyor 200 co-act to form travelling vacuum chambers 213 surrounding each package 208.

With shroud belt 203 and conveyor 200 operating at the same linear velocity, a package 208 in a respective vacuum chamber 213 passes under a first height sensor 214 such as a laser transmitter/receiver unit and thence to a second height sensor unit 215 to detect any change in the distance initially measured between sensor 214 and an inner facing surface 216 of shroud belt 203. An increase in the distance value representing a decrease in the inflated height of the package 208 is indicative of a leak. Like the system of FIGS. 6 to 8, the drive motor (not shown) of conveyor 200 is coupled to a pulse encoder or the like (also not shown) such that the position of each package 208 on conveyor 200 may be monitored as it passes from height sensor 214 to height sensor 215. When a package with a suspected leak is detected, a microprocessor or the like (not shown) coupled to the pulse encoder activates an ejection ram 217 to eject the suspect package into a reject bin 218.

The preload applied to each package 208 by shroud belt 203 may be varied by adjusting the air pressure in plenum 209 as required. The plurality of sub-plenums 209a allows the vacuum chambers 213 to move longitudinally along conveyor 200 without significant leakage between adjacent vacuum chambers 213.

It readily will be apparent to a person skilled in the art that minor air leakages between shroud belt 203 and conveyor 200 can be tolerated as the empirical value of the reduced pressure in each vacuum chamber 213 is not a crucial factor as it is in prior art systems which measure vacuum pressure decay as a determinant of a package leak. In the present invention, the vacuum chamber is, at a minimum, sufficient to smooth out the surface of the package to provide an initial height measurement datum with the mass of the shroud belt providing a preload if required. The vacuum pressure employed are chosen to avoid stretching in the package membrane but as many packaging films such as aluminized polyester have a very low modulus of elasticity, substantial variations in vacuum pressure may be employed.

Figure 12:
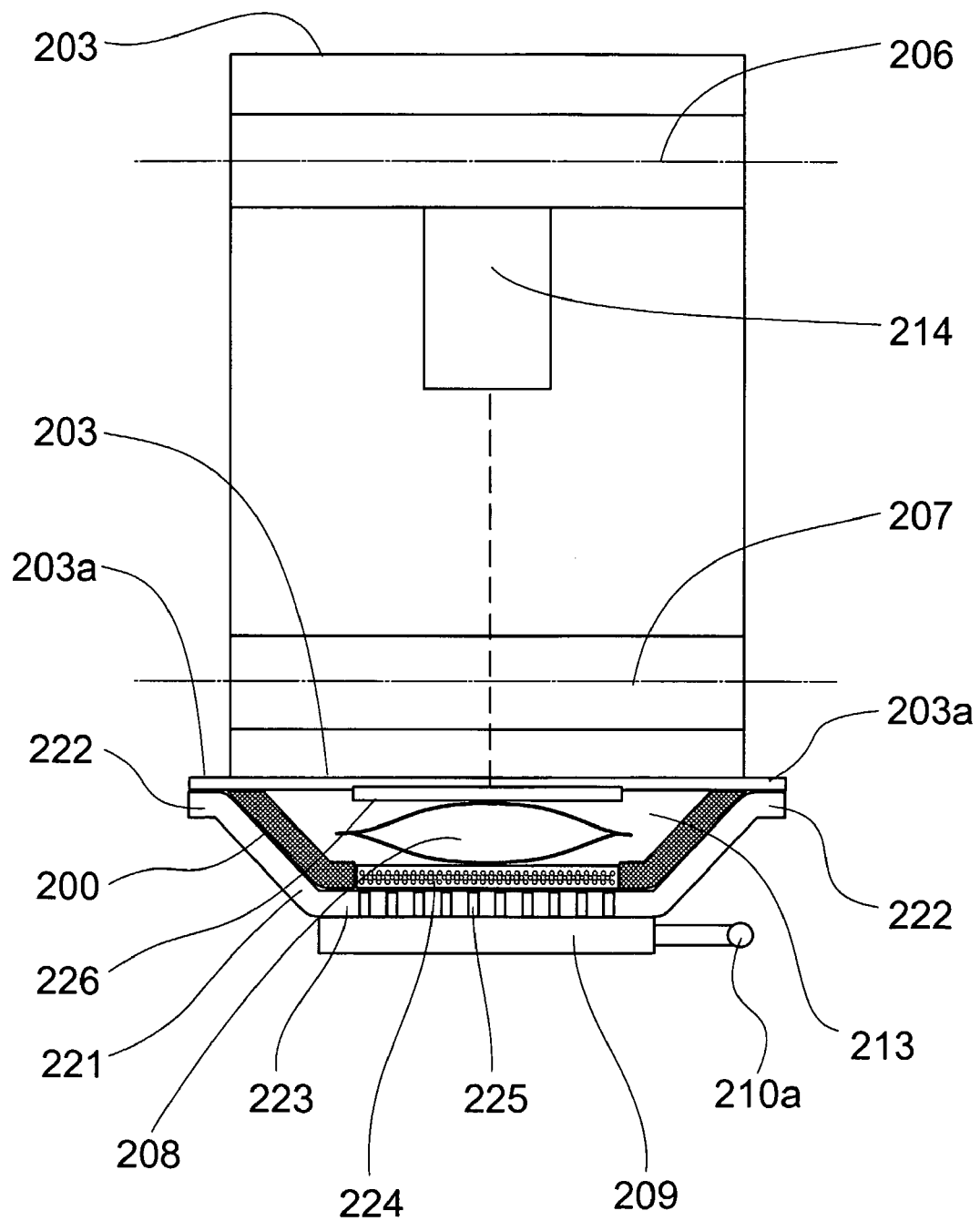
FIG. 12 shows schematically a cross-sectional view through B-B in FIG. 11.
Figure 13:
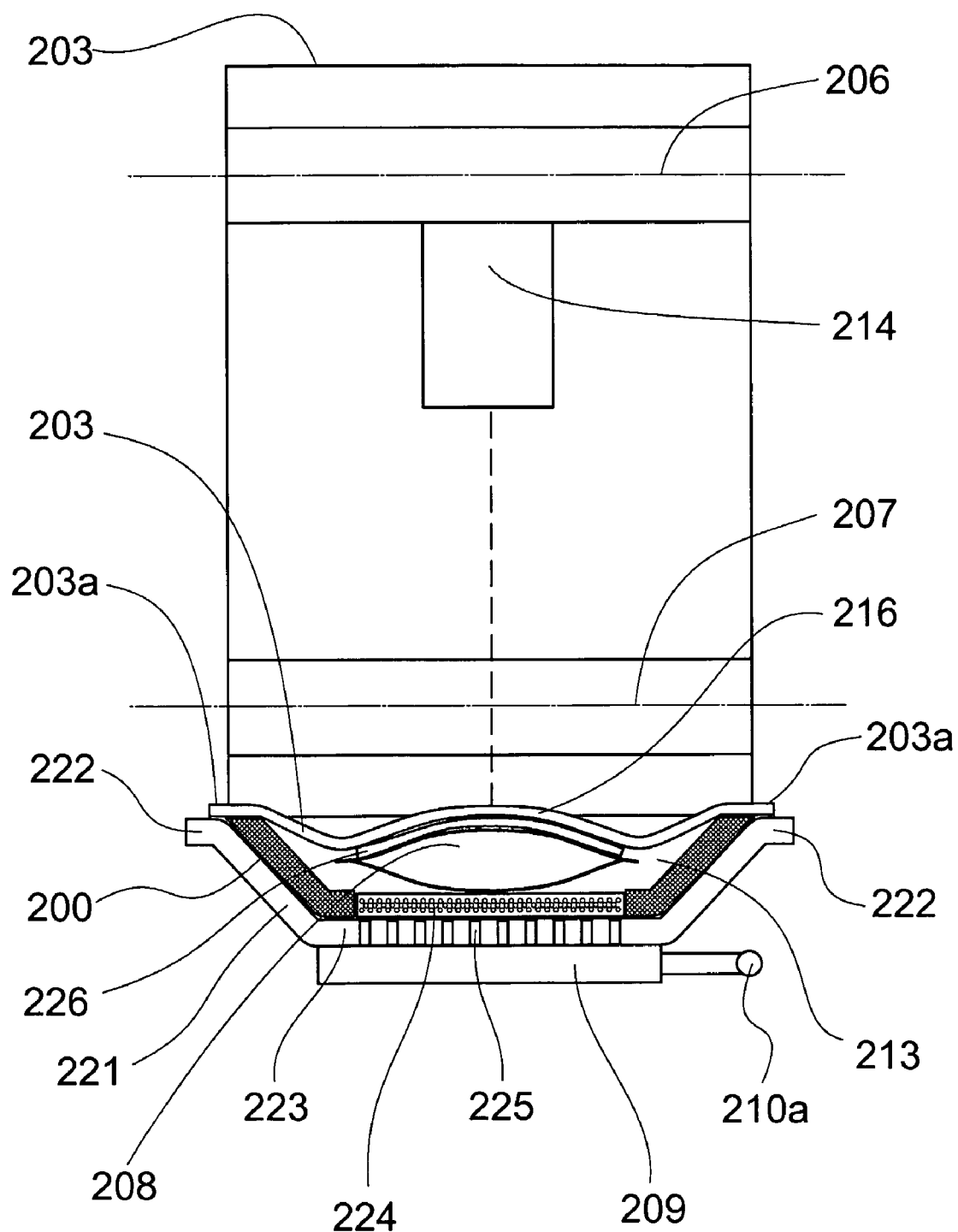
FIG. 13 shows schematically a cross-sectional view through C-C in FIG. 11.

FIGS. 12 and 13 respectively show schematic cross-sectional views through B-B and C-C in FIG. 11.

As flexible conveyor belt 200 approaches the region of shroud belt 203 as shown in FIG. 12, it passes into a trough-like belt support recess 220 having inwardly convergent side walls 221 with transversely extending lips 222 extending along the free edges thereof and a transversely extending floor 223. Floor 223 has perforations 225 therein to permit a fluidic coupling between plenum 209 and vacuum chamber 213 via a gas previous central region 224 of conveyor 100. A layer of gas pervious material such as a non-woven fibrous mat 226 is secured to an undersurface of the otherwise non-gas pervious shroud belt 203 in the central region of belt 203 where it contacts the surface of package 208 in the vacuum chamber 213. As can be seen in FIG. 12, conveyor 200 is supported in a substantially planar state at the point of passing over plenum 209 and the outer edges 203a of shroud belt 203 can form a substantially gas tight seal against lips 222 of recess 220.

As the package 208 moves under the first height sensor 214 as shown in FIG. 13, flexible shroud belt 203 is drawn down into contact with the upper surface of belt 200 in front of and behind package 208 and as it does so, the side regions 203a of shroud belt 203 are drawn inwardly from lips 222 and down onto the convergent side wall regions of belt 200 thus forming a substantially sealed vacuum chamber 213. In this position, the inner facing surface 216 of shroud belt 203 forms a stable datum reference to establish an initial height value between sensor 214 and successive zenith values in the undulating surface of shroud belt 203 passing therebeneath. As can be seen, the upper surface of package 208 is in contact with the air pervious mat 226 and the lower surface of package 208 is in contact with the central gas pervious region 224 of conveyor 200 such that any microscopic pinholes in the package film are not blocked thereby masking a package with a leak defect.

In other variations of the embodiment illustrated in FIGS. 11 to 13, conveyor 200 may be formed with a plurality of shaped rigid recesses to locate individual packages for leak testing. Each package locating recess may include a gas pervious floor which moves over and in contact with a plenum 209 having a plurality of spaced sub-plenums to maintain a generally constant value of reduced air pressure within a vacuum chamber formed by each recess and a portion of shroud belt in contact with an upper circumferential sealing rim associated with each recess.

To accommodate leak testing procedures for packages requiring differing degrees of leak testing rigorousness and/or differing feed rates, the apparatus shown generally in FIGS. 11 to 13 may be constructed in such a manner as to permit telescopic extension or contraction as required. To accommodate varying lengths in either or both of the conveyor belt 200 and the shroud belt 203, festoon belt accumulators (not shown) may be employed to take up excessive belt length when the apparatus is telescopically contracted.

It readily will be apparent to a person skilled in the art that the present invention may take many forms embodying the fundamental concepts of the method and apparatus according to the invention.

The invention provides a robust and reliable leak testing system capable of high volume throughput in an apparatus which is relatively low maintenance in nature.

Also, it readily will be apparent to a person skilled in the art that many modifications and variations may be made to the various aspects of the invention without departing from the spirit and scope thereof.

The invention claimed is:

1. A method for detection of fluid leaks in flexible packages, said method comprising the steps of:
   locating a plurality of flexible fluid containing packages in a sealable common or respective chamber;
   bringing into contact with said plurality of packages a flexible membrane to apply a preload of a predetermined value to each of said packages;
   reducing the gas pressure within said chamber to a predetermined value;
   measuring a reference dimension associated with each said package; and,
   after a predetermined period of time, measuring said reference dimension to detect any change in said dimension as indicative of a leakage of fluid for each said package.

2. A method as claimed in claim 1 wherein said preload is determined by the mass of said membrane.

3. A method as claimed in claim 1 wherein said preload is determined by a gas pressure differential between opposite sides of said membrane.

4. A method as claimed in claim 1 wherein said reference dimension is measured against an upper surface of said membrane.

5. A method as claimed in claim 1 wherein said reference dimension is measured from a position within said chamber remote from each said package.

6. A method as claimed in claim 1 wherein said reference dimension is measured relative to a predetermined datum.

7. A method as claimed in claim 6 wherein said predetermined datum is provided by an inner surface of said chamber.

8. A method as claimed in claim 1 wherein said reference dimension is measured by a device selected from an optical, mechanical, electrical, electro-mechanical, sonic, particle emission or particle absorption dimension measuring systems or a combination thereof.

9. A method as claimed in claim 1 wherein said preload of predetermined value is applied to each said package to accelerate fluid leakage from any leakage aperture therein.

10. A method as claimed in claim 1 wherein said preload of predetermined value is applied to each of said packages to smooth out any wrinkles therein.

11. An apparatus for detection of fluid leaks in a plurality of flexible packages, said apparatus comprising:
    a sealable chamber having at least one wall defined by a flexible membrane;
    a gas evacuation system to reduce gas pressure within said chamber to a predetermined value whereby said flexible membrane is adapted, in use, to contact said packages and apply to each of said packages a preload of predetermined value; and,
    a detection device to measure any change in a reference dimension associated with said packages over a predetermined period of time.

12. An apparatus as claimed in claim 11 wherein said apparatus includes a conveyor mechanism to convey said packages into said chamber for leak detection.

13. An apparatus as claimed in claim 11 wherein said apparatus includes a conveyor mechanism to convey said packages from said chamber after leak detection.

14. An apparatus as claimed in claim 11 including a reject mechanism to reject packages identified as having failed at least one predetermined leak test criterion.

15. An apparatus as claimed in claim 11 wherein said apparatus is adapted to detect leakages in single packages.

16. An apparatus as claimed in claim 11 wherein said apparatus is adapted for leak detection in any one of a plurality of packages in a batch process.

17. An apparatus as claimed in claim 11 wherein said apparatus is adapted for leak detection in any one of a plurality of packages in a continuous system.

18. An apparatus as claimed in claim 11 wherein said detection device is selected from any suitable position detecting system including optical, mechanical, electrical, electro-mechanical, sonic, particle emission or particle absorption position detectors or any combination thereof.

19. An apparatus as claimed in claim 11 wherein said detection device is located internally of said chamber.

20. An apparatus as claimed in claim 11 wherein said detection device is located externally of said chamber.

21. An apparatus as claimed in claim 11 wherein said membrane is adapted to apply a preload of predetermined value to each of said packages to accelerate fluid leakage from any leakage aperture in a package.

* * * * *